United States Patent [11] 3,617,520

[72] Inventor Harris E. Kluksdahl
 San Rafael, Calif.
[21] Appl. No. 836,590
[22] Filed June 25, 1969
[45] Patented Nov. 2, 1971
[73] Assignee Chevron Research Company
 San Francisco, Calif.
 Continuation-in-part of application Ser. No. 729,079, May 14, 1968. Continuation-in-part of Ser. No. 639,719, May 19, 1967, Pat. No. 3,415,737, Continuation-in-part of Ser. No. 560,166, June 21, 1966, abandoned. The portion of the term of the patent subsequent to Dec. 10, 1985, has been disclaimed.

[54] SULFIDING OF LOW PLATINUM CONTENT CATALYST
 6 Claims, No Drawings
[52] U.S. Cl. .................................................. 208/138, 252/439, 252/466 PT
[51] Int. Cl. ...................................................... C10g 35/08
[50] Field of Search ........................................... 208/138, 139; 252/466

[56] References Cited
 UNITED STATES PATENTS

| | | | |
|---|---|---|---|
| 2,848,377 | 8/1958 | Webb | 208/138 |
| 2,939,847 | 6/1960 | Smith et al. | 208/139 |
| 3,434,960 | 3/1969 | Jacobson et al. | 208/138 |
| 2,863,825 | 12/1958 | Engel | 208/138 |
| 3,224,962 | 12/1965 | Baldwin | 208/138 |
| 3,296,119 | 1/1967 | Bicek | 208/139 |
| 3,415,737 | 12/1968 | Kluksdahl | 208/139 |

OTHER REFERENCES

Blom et al. " Hydrocarbon Processing & Petroleum Refiner," pages 132 to 134, Oct. 1963, Vol. 42 No. 10

Primary Examiner—Herbert Levine
Attorneys—A. L. Snow, Frank E. Johnston, Charles J. Tonkin and Dix A. Newell ABSTRACT: The fouling rate of a reforming catalyst comprising less than about 0.3 weight percent platinum and 0.01 to 5 weight percent rhenium in association with a porous solid carrier is significantly decreased by sulfiding the catalyst prior to reforming.

3,617,520

SULFIDING OF LOW PLATINUM CONTENT CATALYST

CROSS-REFERENCES

This application is a continuation-in-part of application Ser. No. 729,079, filed May 14, 1968, which is in turn a continuation-in-part of application Ser. No. 639,719, filed May 19, 1967, now U.S. Pat. No. 3,415,737, which is in turn a continuation-in-part of application Ser. No. 560,166, filed June 21, 1966, now abandoned.

BACKGROUND OF THE INVENTION

1. Field

The present invention relates to reforming, particularly to a method for lowering the fouling rate of a catalyst comprising less than 0.3 weight percent platinum.

2. Prior Art

Reforming is well known in the petroleum industry and refers to the treatment of hydrocarbon feedstocks to improve the octane rating. Catalysts comprising platinum, for example, platinum supported on alumina, are well known and widely used for reforming of naphtha and gasoline boiling range materials. Platinum catalysts are highly selective toward the production of high-octane aromatics and highly active for the several reactions which occur during reforming, e.g., dehydrogenation of naphthenes to aromatics, dehydrocyclization of normal paraffins to naphthenes and aromatics, and isomerization of normal paraffins to isoparaffins. As the reforming process proceeds, the catalyst gradually loses activity principally from the accumulation of carbonaceous deposits on the catalyst. With loss in activity of the catalyst, the reaction temperatures must be increased to maintain conversion to the desired level. This increase in temperature with time to maintain conversion to a constant octane product is referred to as the fouling rate of the catalyst. After the temperature has reached a certain level, e.g. 1,000° F., the reforming process must be discontinued and the catalyst replaced or regenerated. The higher the fouling rate of the catalyst, that is, the faster the temperature must be increased with time in order to maintain constant conversion, the less desirable the catalyst inasmuch as the end of run for the reforming process will occur at an earlier period of time, thereby requiring more frequent replacement or regeneration of the catalyst.

Recently it has been discovered that a catalyst comprising platinum and rhenium in association with a porous solid carrier, e.g., alumina, is extremely effective for the reforming of naphtha feeds. In particular, the catalyst is significantly more active and stable in the production of $C_5+$ gasoline during reforming than a catalyst comprising platinum without rhenium. Furthermore, the fouling rate of the catalyst is lower than that of a catalyst comprising platinum without rhenium. The platinum-rhenium catalyst is described more fully in U.S. Pat. No. 3,415,737.

SUMMARY OF THE INVENTION

It has now been discovered that an unexpected improvement in the fouling rate, i.e., a decrease in the fouling rate, of a low platinum content catalyst can be obtained if the catalyst also contains rhenium and is contacted with sulfur or a sulfur compound in accordance with the present invention prior to contact with naphtha feed. Generally sulfur has been considered detrimental to the fouling rate of a catalyst comprising platinum or platinum-rhenium. While sulfur has sometimes been contacted with a platinum-containing catalyst to control the initial hydrocracking activity of the catalyst on startup, this has only been done because the benefits derived from limited initial hydrocracking activity outweighed the detrimental effect of sulfur on the reforming characteristics of the catalyst. Other means for starting up the reforming process which did not involve sulfur have been desired.

Thus, it came as a surprise to realize that a low platinum catalyst, i.e., a catalyst containing less than 0.3 weight percent platinum, and also containing rhenium, actually was benefited, particularly in terms of fouling rate improvement, by contact with sulfur prior to reforming.

The catalyst is preferably sulfided by heating the catalyst at a temperature above about 500° F. in the presence of hydrogen for a period of time of at least 0.1 hour, then contacting a sulfur compound with the catalyst, the amount of sulfur being at least equal in moles to the moles of the metal components, calculated as metal, present in the catalyst, and then continuing the flow of hydrogen in contact with the catalyst for at least 0.1 hour.

DESCRIPTION OF THE INVENTION

The catalyst which is benefited by the sulfiding process of the present invention contains less than 0.3 weight percent platinum. Preferably the catalyst contains from 0.01 to 0.2 weight percent platinum. Catalysts containing greater than 0.3 weight percent platinum are not benefited by the process of the present invention. Regardless of the form in which platinum exists in association with the porous solid carrier, i.e., whether as compound or metal, or mixtures thereof, the weight percent of platinum is calculated as the metal. The catalyst used in the present invention should also contain rhenium, preferably in an amount of from 0.01 to 5 weight percent and more preferably from 0.01 to 2 weight percent. The weight percent of rhenium is calculated as the metal, whether it exists as compound or metal, or mixtures thereof on the catalyst. For purposes of the present invention iridium can also be present with the platinum and rhenium in an amount of from 0.001 to 1 weight percent. The iridium may be present as the metal or compound, or mixtures thereof.

The porous solid carrier used in the catalyst composition generally is a porous inorganic oxide, particularly inorganic oxides having a surface area of from 50 to 750 m.$^2$/g. Typical acidic inorganic oxide supports which can be used are the naturally occurring aluminum silicates, particularly when acid treated to increase the activity, and synthetically produced cracking supports such as silica-alumina, silica-zirconia, silica-alumina-zirconia, silica-magnesia, silica-alumina-magnesia, and crystalline zeolitic aluminosilicates.

It is preferred, however, that the catalyst have low cracking activity, that is, have limited acidity. Thus, it is generally preferred that alumina be present. Any of the forms of alumina suitable as a support for reforming catalysts can be used. Furthermore, alumina can be prepared by a variety of methods for purposes of this invention. Thus, the alumina can be prepared by adding a suitable alkaline agent such as ammonium hydroxide to a salt of aluminum, such as aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation of aluminum hydroxide gel. Also, alumina may be prepared by the reaction of metallic aluminum with hydrochloric acid, acetic acid, etc., in order to form a hydrosol which can be gelled with a suitable precipitating agent, such as ammonium hydroxide, followed by drying and calcination.

The platinum and rhenium can be associated with the porous inorganic oxide by various methods. The platinum and rhenium can be disposed on the porous inorganic oxide in intimate admixture with each other by a suitable technique such as ion-exchange, coprecipitation, impregnation, etc. It is not necessary that the platinum and rhenium be incorporated onto the porous inorganic oxide support by the same technique. One of the components can be associated with the porous inorganic oxide by one method, such as, for example, coprecipitation, and the other component associated with the porous inorganic oxide by another technique, such as, for example, impregnation. Furthermore, the components can be associated with the porous inorganic oxide by impregnation, either sequentially or simultaneously. In general the porous inorganic oxide is impregnated with an aqueous solution of a decomposable compound of platinum, etc., or rhenium, in sufficient concentration to provide the desired quantity of the platinum and rhenium on the finished catalyst. To incorporate the platinum onto the porous inorganic oxide by impregnation, chloroplatinic acid is preferred. Other platinum group compounds are ammonium chloroplatinates, polyammineplatinum salts, palladium chloride, etc. Rhenium is suitably incorporated onto the support by impregnation with perrhenic acid. Ammonium, or potassium perrhenates, among others can also be used. Iridium can be incorporated onto the support using materials such as chloroiridic acid, iridium trichloride, iridium tribromide, ammonium chloroiridate and ammonium chloroiridite.

The catalyst can be promoted for reforming by the addition of halides, particularly fluoride or chloride. Bromides may also be used. The halides apparently provide a limited amount of acidity to the catalyst which is beneficial to most reforming operations. A catalyst promoted with halide preferably contains from 0.1 to 3 weight percent total halide content. The halides can be incorporated onto the catalyst carrier at any suitable stage of catalyst manufacture, e.g., prior to or following incorporation of platinum and rhenium. Some halide is often incorporated onto the carrier by impregnating with platinum; that is, for example, impregnation with chloroplatinic acid normally results in chloride addition to the carrier. Additional halide may also be incorporated onto the alumina if desired. In general, the halides are combined with the alumina by contacting suitable compounds such as hydrogen fluoride, ammonium fluoride, hydrogen chloride, or ammonium chloride, either in the gaseous form or in a water-soluble form with the alumina. Preferably the fluoride or chloride is incorporated onto the carrier from an aqueous solution containing the halide.

The fouling rate or temperature stability characteristics of the low platinum content catalyst containing rhenium is improved, i.e., the fouling rate is lowered, by contacting with sulfur or a sulfur compound with the catalyst in an amount such that the sulfur is at least equal to the moles of the metal components, calculated as metals. The contacting is preferably done in the presence of hydrogen, particularly pure hydrogen. The sulfur is preferably present as $H_2S$ or as any of the sulfur compounds which convert to $H_2S$ at elevated temperature and pressure and in the presence of hydrogen. Thus, for example, suitable sulfur compounds include dimethyldisulfide, light mercaptans and dimethylsulfide.

Generally for purposes of the present invention, the catalyst is contacted at an elevated temperature, e.g., at least 500° F. and preferably at least 700° F., in flowing hydrogen for a period of time of at least 0.1 hour and preferably at least 0.5 hour. Generally the temperature should not exceed about 1,200° F. Thereafter while continuing the flow of hydrogen at the elevated temperature, the sulfur compound is added to the hydrogen stream in contact with the catalyst. The total sulfur involved, on a mole basis, should be at least equal to the moles of metal components present on the catalyst, calculated as the metal. Thus, the amount of sulfur involved should be at least equal in moles to the moles of platinum and rhenium and iridium, if iridium is present. Following contact of the catalyst with the sulfur compound, the flow of hydrogen is continued at the elevated temperature for at least 0.1 hour and preferably at least 0.5 hour. The flow of hydrogen is generally at least 25 cc./min./g. of catalyst, preferably at least 50 cc./min./g. of catalyst and more preferably at least 100 cc. hydrogen/min./g. of catalyst.

The sulfiding of the catalyst can be accomplished immediately following preparation of the catalyst or can be accomplished after the catalyst is placed in a reforming reactor but prior to reforming. Suitably the sulfiding will occur just prior to reforming; thus, after contacting the catalyst with sulfur or a sulfur compound and then with hydrogen, the feed can be introduced into the reactor.

After the catalyst has been sulfided in accordance with the present invention, the naphtha feed can be contacted with the catalyst at normal reforming conditions. Reforming is generally conducted by contacting a light hydrocarbon oil, e.g., a naphtha feed, boiling within the range of 70° to 550° F. and preferably from 150° to 450° F. with the catalyst at a temperature in the range of from 600° to 1,100° F., preferably 700° to 1,050° F., and at a pressure of from atmospheric to superatmospheric and preferably from 25 to 1,000 p.s.i.g. and more preferably from 50 to 750 p.s.i.g. The actual reforming conditions depend in large measure on the feeds used, whether highly aromatic, paraffinic or naphthenic, or upon the desired octane rating of the product. The feed should be essentially sulfur free; that is, the feed should preferably contain less than about 10 p.p.m. sulfur and more preferably less than 5 p.p.m., and still more preferably less than 1 p.p.m. The presence of sulfur in the feed decreases the activity of the catalyst as well as its stability. Furthermore, the temperature and pressure can be correlated with the liquid hourly space velocity (LHSV) to favor any particularly desirable reforming reaction as, for example, aromatization, isomerization or dehydrogenation. In general, the liquid hourly space velocity will be from 0.1 to 10 and preferably from 1 to 5. Reforming processes are conducted in the presence of hydrogen, either recycle hydrogen or fresh hydrogen. Generally the hydrogen rate will be from 0.5 to 20 moles of hydrogen per mole of feed.

The present invention will be more fully understood by reference to the following example.

Example

A series of platinum catalysts, platinum-rhenium catalysts, and platinum-rhenium-iridium catalysts were prepared and tested for the reforming of naphtha feed to produce high-octane gasoline products. With the exception of the catalysts containing 0.6 weight percent platinum (with or without rhenium), platinum was associated with the alumina by impregnation of alumina with chloroplatinic acid. When rhenium was present, impregnation was accomplished using perrhenic acid. With the catalysts containing iridium, impregnation of the support was accomplished using chloriridic acid. For the catalysts containing 0.6 weight percent platinum, a commercial platinum-alumina catalyst was used; rhenium was added thereto as perrhenic acid.

Sulfiding was accomplished by contacting the catalysts at a temperature of 900° F. in flowing hydrogen (100 cc. hydrogen/min./g. of catalyst) for 1 hour; thereafter a hydrogen gas containing 2 percent $H_2S$ was contacted with the catalyst at a rate of 20 cc./min./g. of catalyst. Contacting with $H_2S$ was continued for 3 minutes. Following the contact with sulfur, pure hydrogen was again contacted with the catalyst for 0.5 hour at 900° F. at a rate of 100 cc./min./g. of catalyst.

For comparison purposes, catalyst samplers were not sulfided; rather, these catalysts were only contacted in the presence of hydrogen at an elevated temperature prior to reforming. In all cases, the contact with hydrogen was the same as for the catalysts which were sulfided except that the sulfiding step was not performed.

Both the presulfided and the unsulfided catalysts thereafter were used in the reforming of a naphtha boiling within the range of 150° to 430° F. and having 37 volume percent paraffins, 25 volume percent aromatics and 38 volume percent naphthenes. The F-1 clear octane rating of the feed was 65. The reforming test was conducted at a pressure of 125 p.s.i.g., a liquid hourly space velocity of 3, and a hydrogen to hydrocarbon mole ratio of 3, using once-through hydrogen. The temperature was adjusted throughout the reforming process to maintain 100 F-1 clear octane product. As the catalyst deactivated, the temperature was necessarily increased to maintain the constant conversion. The increase in temperature as a function of the length of run is a measure of the temperature stability or fouling rate of the catalyst.

The results of the reforming tests with the various catalysts, those sulfided and those not sulfided, are shown in the following table.

An inspection of the table shows that sulfiding of a high platinum content catalyst, that is, 0.6 weight percent platinum containing neither rhenium nor iridium (run 1), did not significantly benefit the fouling rate. (At high fouling rates, e.g.,

TABLE

| Run | Catalyst, weight percent | | | Fouling rate, °F./hr. | |
|---|---|---|---|---|---|
| | Platinum | Rhenium | Iridium | Sulfiding | No sulfiding |
| 1 | 0.6 | | | 5 | 6 |
| 2 | 0.1 | | | 10 | 10 |
| 3 | 0.6 | 0.2 | | 4 | 1.8 |
| 4 | 0.6 | 0.4 | | 3 | 2 |
| 5 | 0.6 | 0.6 | | 2.8 | 2.3 |
| 6 | 0.3 | 0.3 | | 1.9 | 2.0 |
| 7 | 0.3 | 0.3 | | 2.2 | 2.2 |
| 8 | 0.2 | 0.2 | | 3.1 | 6.0 |
| 9 | 0.1 | 0.1 | | 2.2 | 4.8 |
| 10 | 0.1 | 1.0 | | 8 | 12.0 |
| 11 | 0.1 | 0.1 | 0.025 | 2.1 | 3.3 |
| 12 | 0.1 | 0.3 | 0.025 | 1.6 | 2.5 | greater than 5, small differences of one degree or so are not too significant; the fouling is occuring so rapidly that the measuring error is significant.) Furthermore, sulfiding of a low platinum catalyst containing 0.1 weight percent platinum, no rhenium or iridium being present (run 2) did not benefit the fouling rate. Furthermore, sulfiding catalysts containing 0.6 weight percent platinum and various amounts of rhenium (runs 3, 4 and 5) did not improve the fouling rate; in fact, the fouling rate actually increased as a result of sulfiding, compared to nonsulfiding. For the catalysts comprising 0.3 weight percent platinum and 0.3 weight percent rhenium (runs 6 and 7) sulfiding did not seem to change the fouling rate characteristics as compared to no sulfiding. Thus, it was completely unexpected that sulfiding a catalyst containing less than 0.3 weight percent platinum, e.g., 0.2 and 0.1 weight percent, and rhenium significantly lowered the fouling rate of the catalyst as compared to no sulfiding (runs 8–12).

The foregoing disclosure of this invention is not to be considered as limiting since many variations can be made by those skilled in the art without departing from the scope or spirit of the appended claims.

I claim:

1. In a reforming process wherein a naphtha feed containing less than about 10 p.p.m. sulfur, and hydrogen are contacted with a catalyst consisting essentially of a metal component selected from the group consisting of about 0.01–0.3 weight percent platinum and about 0.01–0.3 weight percent platinum plus 0.001 to 1 weight percent iridium in association with a porous solid carrier at reforming conditions, an improved method of maintaining a low fouling rate during the process, comprising:
   1. including 0.01 to 5 weight percent rhenium with the catalyst; and
   2. sulfiding the catalyst prior to use in the reforming process.

2. The process of claim 1 wherein said porous solid carrier is an inorganic oxide.

3. The process of claim 2 wherein said inorganic oxide is alumina.

4. A method for decreasing the fouling rate of a catalyst when said catalyst is used in reforming a naphtha feed containing less than about 10 p.p.m. sulfur, said catalyst consisting essentially of a metal component selected from the group consisting of about 0.01–0.3 weight percent platinum and about 0.01–0.3 weight percent platinum plus 0.001 to 1 weight percent iridium and from 0.01 to 5 weight percent rhenium in association with alumina, which comprises, prior to reforming:
   1. contacting the catalyst with flowing hydrogen at a temperature above about 500° F. for at least 0.1 hour;
   2. adding a sulfur compound to the flowing hydrogen, the amount of sulfur being at least equal in moles of sulfur to the moles of the platinum and rhenium in the catalyst, calculated as the metals;
   3. discontinuing the sulfur addition; and
   4. continuing the flow of hydrogen in contact with the catalyst for at least 0.1 hour.

5. In a reforming process wherein a naphtha feed containing less than about 10 p.p.m. sulfur is contacted, at reforming conditions including a temperature from 700° F. to 1,050° F. and a pressure from 25 to 1,000 p.s.i.g., in the presence of hydrogen with a catalyst consisting essentially of a metal component selected from the group consisting of platinum and platinum plus 0.001 to 1 weight percent iridium and a porous solid carrier to produce a high-octane gasoline product, the improved method of obtaining a low fouling rate during the process, which comprises:
   1. maintaining the platinum content of the catalyst at about 0.01–0.2 weight percent;
   2. incorporating rhenium in the catalyst in an amount from 0.01 to 5 weight percent;
   3. prior to use in the reforming process, contacting the catalyst with flowing hydrogen at a temperature above about 500° F. for at least 0.1 hour;
   4. adding a sulfur compound to the flowing hydrogen, the amount of sulfur being at least equal in moles of sulfur to the moles of the platinum and rhenium in the catalyst, calculated as the metals;
   5. discontinuing the sulfur addition; and
   6. continuing the flow of hydrogen in contact with the catalyst for at least 0.1 hour.

6. The process of claim 4 wherein the metal component is about 0.01–0.3 weight percent platinum plus 0.001 to 1 weight percent iridium.

* * * * *